US009669862B1

(12) United States Patent
Dubay et al.

(10) Patent No.: US 9,669,862 B1
(45) Date of Patent: Jun. 6, 2017

(54) STEERING COLUMN HAVING AN ENERGY ABSORPTION ASSEMBLY

(71) Applicant: Steering Solutions IP Holding Corporation, Saginaw, MI (US)

(72) Inventors: Robert W. Dubay, Saginaw, MI (US); Matthew T. Vincent, Saginaw, MI (US); Donald A. Buzzard, Saginaw, MI (US); Michael P. Anspaugh, Bay City, MI (US); Randy W. Jones, North Branch, MI (US); Roger A. Bourbina, Saginaw, MI (US); Robert D. Bueche, Montrose, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/046,805

(22) Filed: Feb. 18, 2016

(51) Int. Cl.
  *B62D 1/19* (2006.01)
(52) U.S. Cl.
  CPC ............... *B62D 1/19* (2013.01); *B62D 1/192* (2013.01); *B62D 1/195* (2013.01)
(58) Field of Classification Search
  CPC combination set(s) only.
  See application file for complete search history.

(56) References Cited

U.S. PATENT DOCUMENTS

| | | | | |
|---|---|---|---|---|
| 4,838,576 A * | 6/1989 | Hamasaki | ............... | B62D 1/195 188/372 |
| 5,547,221 A * | 8/1996 | Tomaru | .................. | B62D 1/195 280/777 |
| 5,738,377 A * | 4/1998 | Sugiki | .................... | B62D 1/195 188/376 |
| 9,540,034 B2 * | 1/2017 | Takahashi | .............. | B62D 1/195 |
| 2005/0104355 A1 * | 5/2005 | Ishida | .................... | B62D 1/195 280/777 |
| 2006/0214411 A1 * | 9/2006 | Ikegaya | .................. | B62D 1/19 280/777 |
| 2007/0068311 A1 * | 3/2007 | Shimoda | ................ | B62D 1/195 74/493 |
| 2007/0194563 A1 * | 8/2007 | Menjak | .................. | B62D 1/195 280/777 |
| 2012/0125140 A1 * | 5/2012 | Ridgway | ................ | B62D 1/195 74/493 |

(Continued)

FOREIGN PATENT DOCUMENTS

| | | | | |
|---|---|---|---|---|
| DE | 102008060225 A1 * | 6/2010 | ............ | B62D 1/184 |
| JP | 2004314847 A * | 11/2004 | | |

(Continued)

*Primary Examiner* — Nicole Verley
(74) *Attorney, Agent, or Firm* — Cantor Colburn LLP

(57) ABSTRACT

A portion of a steering column assembly includes an energy absorption assembly. The energy absorption assembly includes an energy absorption strap and a breakaway member. The energy absorption strap has a first strap portion coupled to an upper jacket assembly and a second strap portion coupled to a lower jacket assembly. The breakaway member has a first breakaway member, a second breakaway member, and a frangible area. The first breakaway member defines a first opening that receives the first strap portion. The second breakaway member defines a second opening that receives the second strap portion. The frangible area joins the first breakaway member to the second breakaway member.

20 Claims, 3 Drawing Sheets

(56) References Cited

U.S. PATENT DOCUMENTS

| | | | |
|---|---|---|---|
| 2015/0128752 A1* | 5/2015 | Buzzard | F16F 7/128 |
| | | | 74/493 |
| 2016/0244015 A1* | 8/2016 | Dubay | B60R 21/02 |
| 2016/0272235 A1* | 9/2016 | Takahashi | B62D 1/184 |
| 2016/0288820 A1* | 10/2016 | Myohoji | B62D 1/195 |
| 2016/0297464 A1* | 10/2016 | Johta | B62D 1/184 |
| 2016/0368524 A1* | 12/2016 | Tinnin | B62D 1/185 |

FOREIGN PATENT DOCUMENTS

| | | | | |
|---|---|---|---|---|
| JP | 2004338509 A | * | 12/2004 | |
| JP | 2004345632 A | * | 12/2004 | |
| JP | 2005053349 A | * | 3/2005 | |
| JP | 2005096731 A | * | 4/2005 | |
| JP | 2005119369 A | * | 5/2005 | |
| JP | 2006193079 A | * | 7/2006 | |
| JP | 2006273047 A | * | 10/2006 | |
| JP | EP 1707471 A1 | * | 10/2006 | B62D 1/19 |
| JP | 2007038822 A | * | 2/2007 | |
| JP | EP 1839994 A2 | * | 10/2007 | B62D 1/195 |
| JP | 2014201288 A | * | 10/2014 | |

\* cited by examiner

STEERING COLUMN HAVING AN ENERGY ABSORPTION ASSEMBLY

BACKGROUND OF THE INVENTION

The present disclosure relates to a vehicle portion of a steering column assembly having an energy absorption assembly.

Vehicle steering columns are sometimes equipped with a collapsible mechanism such that components of the vehicle steering column are movable and collapsible along a longitudinal axis. The collapsibility of the steering column is generally energy absorbing during a steering column collapse event.

SUMMARY OF THE INVENTION

According to an embodiment of the present invention, a portion of a steering column assembly is provided. The portion of a steering column assembly includes a lower jacket assembly, an upper jacket assembly, and an energy absorption assembly. The lower jacket assembly has a body that defines a bore extending along a steering column axis. The body further defines an opening extending from an exterior surface of the body towards the bore, transverse to the steering column axis. The upper jacket assembly is at least partially received within the bore of the lower jacket assembly. The upper jacket assembly is movable along the steering column axis relative to the lower jacket assembly. The energy absorption assembly at least partially extends through the opening. The energy absorption assembly includes an energy absorption strap and a breakaway member. The energy absorption strap has a first strap portion coupled to the upper jacket assembly and a second strap portion coupled to the lower jacket assembly. The breakaway member has a first breakaway member defining a first opening that receives the first strap portion. The breakaway member has a second breakaway member defining a second opening that receives the second strap portion.

According to another embodiment of the present invention, a portion of a steering column assembly is provided. The portion of a steering column assembly includes a lower jacket assembly having a body, an upper jacket assembly at least partially received within lower jacket assembly, and an energy absorption assembly. The energy absorption assembly includes an energy absorption strap and a breakaway member. The energy absorption strap has a first strap portion coupled to the upper jacket assembly, a second strap portion coupled to the lower jacket assembly, and an intermediate strap portion that extends between the first strap portion and the second strap portion. The breakaway member has a first breakaway member, a second breakaway member, and a frangible area. The first breakaway member defines a first opening that receives the first strap portion. The second breakaway member defines a second opening that receives the second strap portion. The frangible area joins the first breakaway member to the second breakaway member.

According to yet another embodiment of the present invention, an energy absorption assembly provided with a portion of a steering column assembly is provided. The energy absorption assembly includes an energy absorption strap and a breakaway member. The energy absorption strap has a first strap portion coupled to an upper jacket assembly, a second strap portion coupled to a lower jacket assembly, the second strap portion, and an intermediate strap portion extending between the first strap portion and the second strap portion. The breakaway member has a first breakaway member, a second breakaway member, and a frangible area. The first breakaway member has a first face that extends between a first wall and a second wall, a second face disposed opposite the first face and extends between the first wall and the second wall, and a first opening that extends from the first face to the second face, the first opening receives the first strap portion. The second breakaway member has a third face that extends between a third wall and a second wall, a fourth face disposed opposite the third face and extends between the third wall and the fourth wall, and a second opening that extends from the third face to the fourth face, the second opening that receives the second strap portion. The frangible area joins the first breakaway member to the second breakaway member.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Throughout this specification, the term "attach," "attachment," "connected", "coupled," "coupling," "mount," or "mounting" shall be interpreted to mean that one structural component or element is in some manner connected to or contacts another element either directly or indirectly through at least one intervening structural element or is integrally formed with the other structural element.

Figure 1:
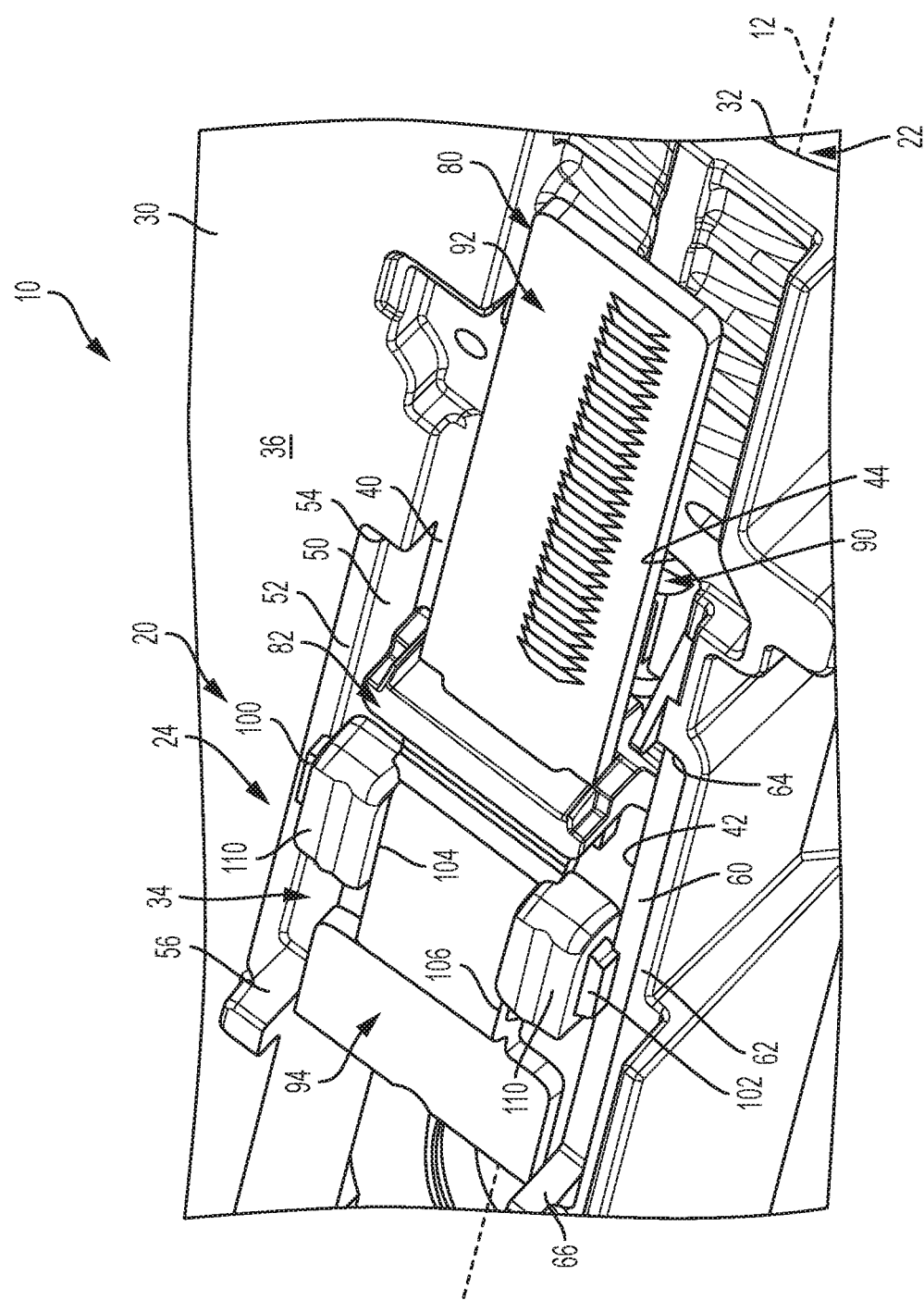
FIG. 1 a partial perspective view of a portion of a steering column assembly.

Referring to FIG. 1, a partial perspective view of a portion of a steering column assembly 10 is shown. The portion of a steering column assembly 10 extends along a steering column axis 12. The portion of a steering column assembly 10 is an adjustable portion of a steering column assembly configured to be movable along the steering column axis 12. In at least one embodiment, the portion of a steering column assembly 10 is configured to pivot or rake relative to the steering column axis 12. The portion of a steering column assembly 10 includes a lower jacket assembly 20, an upper jacket assembly 22, and an energy absorption assembly 24.

Figure 2:
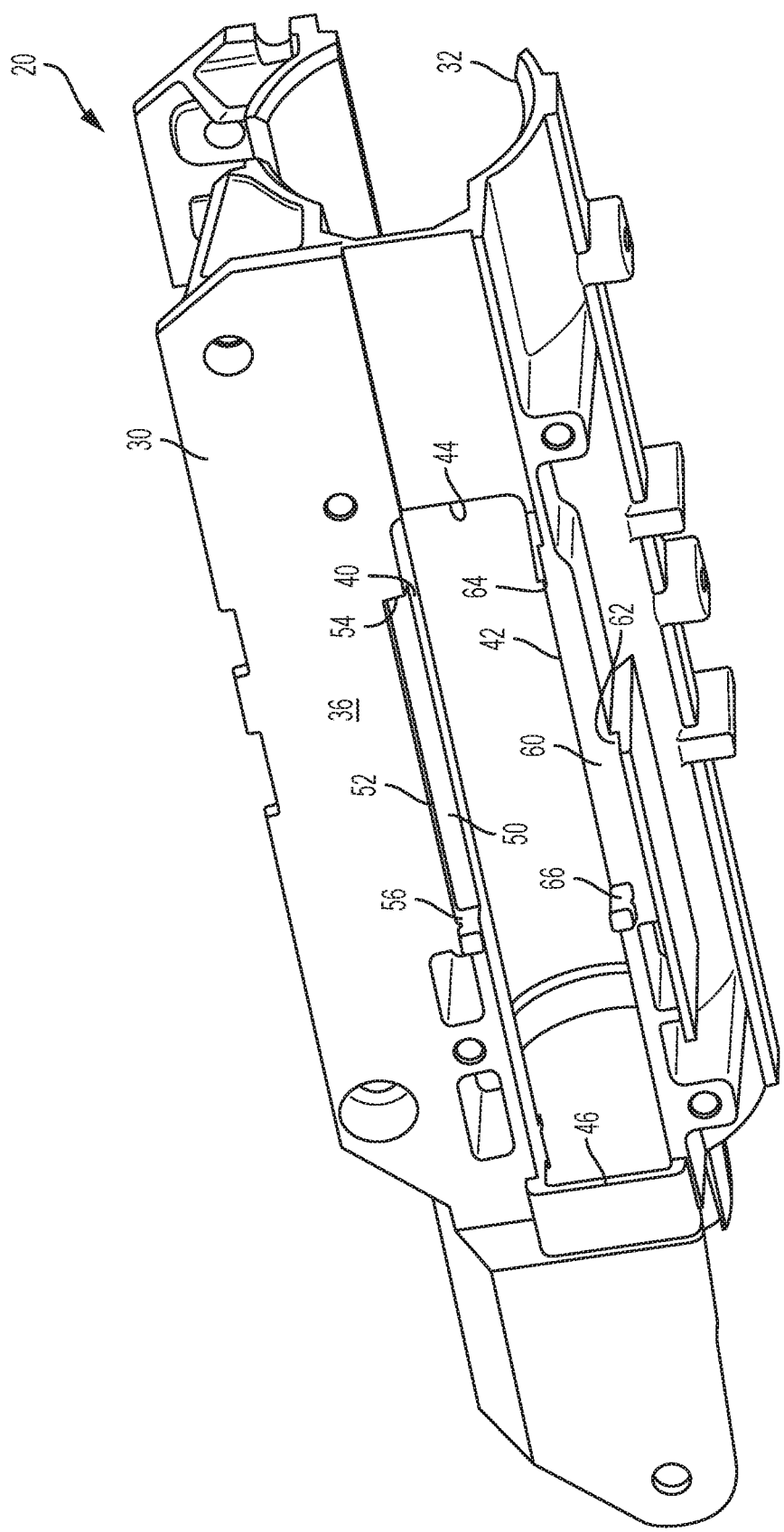
FIG. 2 is a perspective view of the lower jacket assembly.

Referring to FIGS. 1 and 2, the lower jacket assembly 20 is configured to connect to a mounting bracket that connects the portion of a steering column assembly 10 to the vehicle. The mounting bracket is configured as a rake bracket that allows adjustment of the pitch or rake of the portion of a steering column assembly 10. The lower jacket assembly 20 has a body 30. The body 30 defines a bore 32 having an inner surface and an opening 34. The bore 32 extends along the steering column axis 12. The bore 32 may not extend completely through the body 30 of the lower jacket assembly 20. The opening 34 extends from an exterior surface 36 of the body 30 towards the bore 32. The opening 34 extends transverse to the bore 32, such that the opening 34 extends along an axis substantially transverse to the steering column axis 12.

The opening 34 is defined by a first sidewall 40, a second sidewall 42, a first end wall 44, and a second end wall 46. The first sidewall 40 extends from the exterior surface 36 of the body 30 towards the bore 32. The second sidewall 42 is spaced apart from the first sidewall 40. The second sidewall 42 is disposed substantially parallel to the first sidewall 40. The first end wall 44 extends between a first end of the first sidewall 40 and a first end of the second sidewall 42. The second end wall 46 is spaced apart from the first end wall 44. The second end wall 46 extends between a second end of the first sidewall 40 and a second end of the second sidewall 42.

The body 30 of the lower jacket assembly 20 includes a first step surface 50, a first wall 52, a first stop wall 54, and a second stop wall 56. The first step surface 50 extends between the first sidewall 40, the first wall 52, the first stop wall 54, and the second stop wall 56. The first step surface 50 is disposed substantially perpendicular to the first sidewall 40, the first wall 52, the first stop wall 54, and the second stop wall 56. The first step surface 50 is disposed substantially parallel to the steering column axis 12.

The first wall 52 is disposed substantially perpendicular to the first step surface 50, the first stop wall 54, and the second stop wall 56. The first wall 52 is disposed substantially parallel to the first sidewall 40. The first wall 52 is disposed substantially perpendicular to the steering column axis 12.

The first stop wall 54 extends between the first step surface 50, the first wall 52, and the exterior surface 36 of the body 30. The second stop wall 56 is spaced apart from and disposed opposite the first stop wall 54. The second stop wall 56 extends between the first step surface 50, the first wall 52, and the exterior surface 36 of the body 30.

The body 30 of the lower jacket assembly 20 includes a second step surface 60, a second wall 62, a third stop wall 64, and a fourth stop wall 66. The second step surface 60 extends between the second sidewall 42, the second wall 62, the third stop wall 64, and the fourth stop wall 66. The second step surface 60 is disposed substantially perpendicular to the second sidewall 42, the second wall 62, the third stop wall 64, and the fourth stop wall 66. The second step surface 60 is disposed substantially parallel to the steering column axis 12.

The second wall 62 is disposed substantially perpendicular to the second step surface 60, the third stop wall 64, and the fourth stop wall 66. The second wall 62 is disposed substantially parallel to the second sidewall 42. The second wall 62 is disposed substantially perpendicular to the steering column axis 12.

The third stop wall 64 extends between the second step surface 60, the second wall 62, and the exterior surface 36 of the body 30. The fourth stop wall 66 is spaced apart from and disposed opposite the third stop wall 64. The fourth stop wall 66 extends between the second step surface 60, the second wall 62, and the exterior surface 36 of the body 30.

The upper jacket assembly 22 is at least partially received within the bore 32 of the body 30 of the lower jacket assembly 20. The upper jacket assembly 22 is movable along the steering column axis 12 relative to the lower jacket assembly 20. The upper jacket assembly 22 includes a mounting feature 70. The mounting feature 70 is disposed on an exterior surface of the upper jacket assembly 22. In at least one embodiment, the mounting feature 70 is disposed within a pocket or opening formed by the upper jacket assembly 22 such that the mounting feature 70 is at least partially recessed within the upper jacket assembly 22. The mounting feature 70 receives at least a portion of the energy absorption assembly 24 to secure the energy absorption assembly 24 to the upper jacket assembly 22.

Referring to FIGS. 1-4, the energy absorption assembly 24 includes an energy absorption strap 80 and a breakaway member 82. The energy absorption strap 80 and breakaway member 82 at least partially extends through the opening 34 of the body 30 of the lower jacket assembly 20. The energy absorption assembly 24 is configured to provide a drag load or force opposing collapsing or translation of the upper jacket assembly 22 relative to the lower jacket assembly 20 during a steering column collapse event. The drag load or force opposing collapsing of the upper jacket assembly 22 relative to the lower jacket assembly 20 is adaptive or variable based on the configuration of the energy absorption strap 80 and the breakaway member 82.

The level of the initial breakaway load to initiate a steering column collapse event is tunable by varying the geometry of the energy absorption strap 80 and/or the configuration of the breakaway member 82. The initial breakaway load may be further tuned by an adjustment of a breakaway load, shear load, or fracture load of the breakaway member 82. As a result of such tuning, the breakaway member 82 may shear and permit the energy absorption strap 80 to unroll and provide the drag load or force opposing collapsing or translation of the upper jacket assembly 22 relative to the lower jacket assembly 20.

The energy absorption strap 80 includes a first portion 90, a second portion 92, and an intermediate portion 94 that extends between the first portion 90 and the second portion 92. The first portion 90 is coupled to the upper jacket assembly 22 through the mounting feature 70 by a fastener 96.

The second portion 92 is configured to be coupled to the lower jacket assembly 20. The second portion 92 is configured to interface with a component of the lower jacket assembly 20 such as a component having a tooth that engages a portion of the second portion 92. The second portion 92 is disposed substantially parallel to but not coplanar with the first portion 90. During a steering column collapse event in which the energy absorption strap unrolls, the first portion 90 moves relative to the second portion 92.

The second portion 92 includes a first shoulder 100 and a second shoulder 102. The first shoulder 100 extends from a first edge 104 of the second portion 92 in a first direction. The first shoulder 100 extends towards the first wall 52. The first shoulder 100 is disposed substantially parallel to the first step surface 50. In at least one embodiment, the first shoulder 100 engages the first step surface 50. The second shoulder 102 extends from a second edge 106 of the second portion 92 in a second direction disposed opposite the first direction. The second shoulder 102 extends towards the second wall 62. The second shoulder 102 is disposed substantially parallel to the second step surface 60. In at least one embodiment, the second shoulder 102 engages the second step surface 60.

Each of the first shoulder 100 and the second shoulder 102 is provided with a bumper 110. The bumper 110 surrounds the first shoulder 100 and the second shoulder 102. The bumper 110 of the first shoulder 100 engages the first step surface 50. The bumper 110 of the second shoulder 102 engages the second step surface 60.

The bumper 110 of the first shoulder 100 and the bumper 110 of the second shoulder 102 translate along the first step surface 50 and the second step surface 60, respectively, during a vehicle operator initiated telescope operation in which the upper jacket assembly 22 translates relative to the lower jacket assembly 20 to adjust a position of a steering wheel attached to the lower jacket assembly 20 relative to the vehicle operator.

The bumper 110 of the first shoulder 100 and the bumper 110 of the second shoulder 102 engages the first stop wall 54 and the third stop wall 64, respectively, to inhibit further translation of the upper jacket assembly 22 relative to the lower jacket assembly 20 towards the vehicle operator. The bumper 110 of the first shoulder 100 and the bumper 110 of the second shoulder 102 engages the second stop wall 56 and the fourth stop wall 66, respectively, to inhibit further translation of the upper jacket assembly 22 relative to the lower jacket assembly 20 away from the vehicle operator towards the front of a vehicle.

The breakaway member 82 may be configured to provide lateral guidance to the upper jacket assembly 22 during a telescope operation. The breakaway member 82 guides the upper jacket assembly 22 within the opening 34 of the body 30 of the lower jacket assembly 20 and aids in inhibiting tipping or rotation of the upper jacket assembly 22 relative to the lower jacket assembly 20 during translation for adjustment by the vehicle operator.

The breakaway member 82 includes a first breakaway member 120, a second breakaway member 122, and a frangible area 124. The first breakaway member 120 is disposed proximate the upper jacket assembly 22. The first breakaway member 120 includes a first wall 130, a second wall 132, a first face 134, a second face 136, and a first opening 138. The first wall 130 is disposed opposite the second wall 132. The first wall 130 is disposed proximate and is disposed substantially parallel to the first sidewall 40. The second wall 132 is disposed proximate and is disposed substantially parallel to the second sidewall 42.

The first face 134 extends between a first portion of the first wall 130 and a first portion of the second wall 132. The second face 136 is disposed opposite the first face 134. The second face 136 extends between a second portion of the first wall 130 and a second portion of the second wall 132. The second face 136 is disposed proximate to and abuts the upper jacket assembly 22. In at least one embodiment, the second face 136 abuts an end surface of the mounting feature 70 disposed on the upper jacket assembly 22. The first opening 138 extends from the first face 134 to the second face 136. In at least one embodiment, the first opening 138 is defined by the first breakaway member 120, the second breakaway member 122, and the frangible area 124. At least a portion of the first portion 90 of the energy absorption strap 80 extends through the first opening 138.

The second breakaway member 122 includes a third wall 150, a fourth wall 152, a third face 154, a fourth face 156, and a second opening 158. The third wall 150 is disposed opposite the fourth wall 152. The third face 154 extends between a first portion of the third wall 150 and a first portion of the fourth wall 152. The fourth face 156 is disposed opposite the third face 154. The fourth face 156 extends between a second portion of the third wall 150 and a second portion of the fourth wall 152.

The first face 134 is disposed substantially parallel to but not coplanar with the third face 154. The second face 136 is disposed substantially parallel to but not coplanar with the fourth face 156.

The second opening 158 extends from the third face 154 to the fourth face 156. At least a portion of the second portion 92 of the energy absorption strap 80 extends through the second opening 158.

The frangible area 124 extends between the first breakaway member 120 and the second breakaway member 122. The frangible area 124 joins the first breakaway member 120 the second breakaway member 122. The frangible area 124 may have various shapes when viewed in cross-section or from the side, such as, a triangular, rectangular, square, ovate, or other shape.

Figure 3:
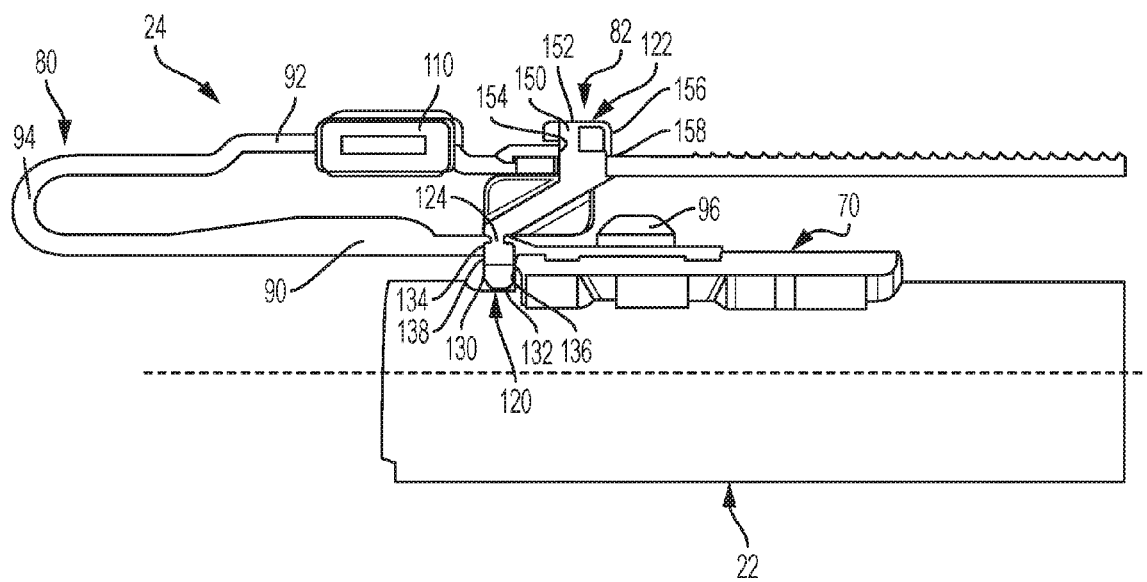
FIG. 3 is a side view of an energy absorption assembly coupled to an upper jacket assembly prior to a steering column collapse event, with the lower jacket assembly removed for clarity.

Referring to FIG. 3, prior to a steering column collapse event, the first breakaway member 120 has a first breakaway member thickness. The second breakaway member 122 has a second breakaway member thickness. The frangible area 124 has a frangible area thickness. The frangible area thickness is less than the first breakaway member thickness and the second breakaway member thickness. In at least one embodiment, the first breakaway member thickness is less than the second breakaway member thickness.

In at least one embodiment, the first breakaway member 120 has a first breakaway member cross-sectional area, the second breakaway member 122 has a second breakaway member cross-sectional area, and the frangible area 124 has a frangible area cross-sectional area. The frangible area cross-sectional area is less than the first breakaway member cross-sectional area and the second breakaway member cross-sectional area. The reduced thickness or cross-sectional area of the frangible area 124 enables the breakaway member 82 to shear or fracture proximate the frangible area 124 to initiate a steering column collapse event.

Figure 4:
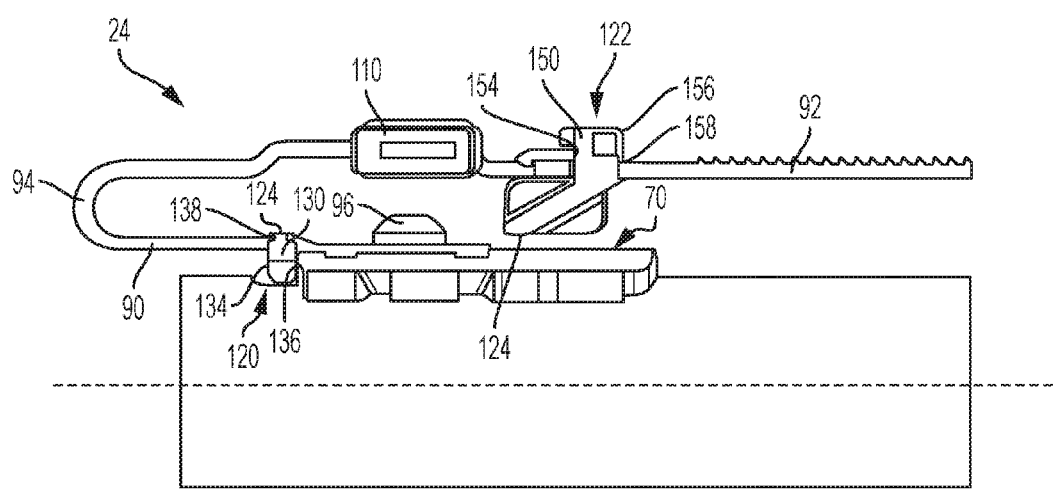
FIG. 4 is a side view of the energy absorption assembly coupled to the upper jacket assembly after initiation of the steering column collapse event, with the lower jacket assembly removed for clarity.

Referring to FIG. 4, during a steering column collapse event or during the initiation of a steering column collapse event in which the upper jacket assembly 22 moves in a collapse direction into the lower jacket assembly 20 the second face 136 of the first breakaway member 120 further engages a surface of the upper jacket assembly 22 or the mounting feature 70 and the second breakaway member 122 translates and/or tips relative to the first breakaway member 120. The tipping of the second breakaway member 122 relative to the first breakaway member 120 encourages or results in the fracturing, breaking, or shearing of the breakaway member 82 proximate the frangible area 124. Preloading or variable amounts of clearance may be added between the second face 136 of the first breakaway member 120 and the end surface of the mounting feature 70.

As the upper jacket assembly 22 translates in the collapse direction further into the lower jacket assembly 20 and the second portion 92 of the energy absorption strap 80 translates relative to the first portion 90 of the energy absorption strap 80, the second breakaway member 122 becomes spaced apart from the first breakaway member 120. The first breakaway member 120 remains engaged with the upper jacket assembly 22 and/or the mounting feature 70 as the second breakaway member 122 translates with the energy absorption strap 80. Subsequent to the fracturing, breaking, or shearing of the breakaway member 82 proximate the frangible area 124, the energy absorption strap 80 unrolls and absorbs kinetic energy during the steering column collapse event.

The thickness, cross-sectional area, or shape of the frangible area 124 may be varied to adjust the initial breakaway load at which the breakaway member 82 fractures proximate the frangible area 124 to initiate the unrolling of the energy absorption strap 80. The varying of the thickness, cross-sectional area, or shape of the frangible area 124 enables the initial breakaway load to be adjusted to meet steering column collapse load requirements.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A portion of a steering column assembly, comprising:
   a lower jacket assembly having a body, the body defining a bore extending along a steering column axis and the body defining an opening extending from an exterior surface towards the bore, transverse to the steering column axis;
   an upper jacket assembly at least partially received within the bore of the lower jacket assembly, the upper jacket assembly being movable along the steering column axis relative to the lower jacket assembly; and
   an energy absorption assembly extending through the opening, the energy absorption assembly including:
      an energy absorption strap having a first strap portion coupled to the upper jacket assembly and a second strap portion coupled to the lower jacket assembly, and
      a breakaway member having a first breakaway member defining a first opening that receives the first strap portion and a second breakaway member defining a second opening that receives the second strap portion.

2. The portion of a steering column assembly of claim 1, wherein the breakaway member has a frangible area extending between the first breakaway member and the second breakaway member.

3. The portion of a steering column assembly of claim 2, wherein a frangible area thickness is less than a first breakaway member thickness and a second breakaway member thickness.

4. The portion of a steering column assembly of claim 3, wherein during a steering column collapse event the upper jacket assembly translates relative to the lower jacket assembly and the breakaway member breaks proximate the frangible area.

5. The portion of a steering column assembly of claim 1, wherein the opening is defined by a first sidewall spaced apart from a second sidewall and a first end wall extending between the first sidewall and the second sidewall.

6. The portion of a steering column assembly of claim 5, wherein the body includes a first step surface extending between the first sidewall and a first wall and the first wall extends between the first step surface and the exterior surface of the body.

7. The portion of a steering column assembly of claim 6, wherein the body defines a second step surface extending between the second sidewall and a second wall and the second wall extends between the second step surface and the exterior surface of the body.

8. The portion of a steering column assembly of claim 7, wherein the second strap portion includes a first shoulder extending in a first direction and a second shoulder extending in a second direction disposed opposite the first direction.

9. The portion of a steering column assembly of claim 8, wherein the first shoulder engages the first step surface and the second shoulder engages the second step surface.

10. A portion of a steering column assembly, comprising:
    a lower jacket assembly having a body;
    an upper jacket assembly at least partially received within the lower jacket assembly;
    an energy absorption assembly that includes:
       an energy absorption strap having a first strap portion coupled to the upper jacket assembly, a second strap portion coupled to the lower jacket assembly, and an intermediate strap portion extending between the first strap portion and the second strap portion; and
       a breakaway member having a first breakaway member defining a first opening that receives the first strap portion, a second breakaway member defining a second opening that receives the second strap portion, and a frangible area joining the first breakaway member to the second breakaway member.

11. The portion of a steering column assembly of claim 10, wherein the first breakaway member includes a first wall disposed opposite a second wall, a first face extending between the first wall and the second wall, a second face disposed opposite the first face and extending between the first wall and the second wall, the first opening extending from the first face to the second face.

12. The portion of a steering column assembly of claim 11, wherein the second face of the first breakaway member abuts the upper jacket assembly.

13. The portion of a steering column assembly of claim 11, wherein the second breakaway member includes a third wall disposed opposite a fourth wall, a third face extending between the third wall and the second wall, a fourth face disposed opposite the third face and extending between the third wall and the fourth wall, the second opening extending from the third face to the fourth face.

14. The portion of a steering column assembly of claim 13, wherein the first face is disposed substantially parallel to but not coplanar with the third face.

15. The portion of a steering column assembly of claim 14, wherein the second face is disposed substantially parallel to but not coplanar with the fourth face.

16. An energy absorption assembly provided with a portion of a steering column assembly, the energy absorption assembly comprising:
    an energy absorption strap having
       a first strap portion coupled to an upper jacket assembly, a second strap portion coupled to a lower jacket assembly, the second strap portion, and an intermediate strap portion extending between the first strap portion and the second strap portion; and
    a breakaway member having
       a first breakaway member having a first face extending between a first wall and a second wall, a second face disposed opposite the first face and extending between the first wall and the second wall, and a first opening extending from the first face to the second face, the first opening receives the first strap portion, a second breakaway member having a third face extending between a third wall and a fourth wall, a fourth face disposed opposite the third face and extending between the third wall and the fourth wall, and a second opening extending from the third face to the fourth face, the second opening that receives the second strap portion, and a frangible area joining the first breakaway member to the second breakaway member.

17. The energy absorption assembly of claim 16, wherein a frangible area thickness is less than a first breakaway member thickness and a second breakaway member thickness.

18. The energy absorption assembly of claim 16, wherein the energy absorption strap and the breakaway member at least partially extend through an opening defined by the lower jacket assembly.

19. The energy absorption assembly of claim 16, wherein the second face of the first breakaway member is disposed proximate a surface of an upper jacket assembly.

20. The energy absorption assembly of claim 17, wherein during a steering column collapse event the upper jacket assembly translates relative to the lower jacket assembly, the second face of the first breakaway member engages the face of the upper jacket assembly, and the breakaway member breaks proximate the frangible area.

\* \* \* \* \*